UNITED STATES PATENT OFFICE.

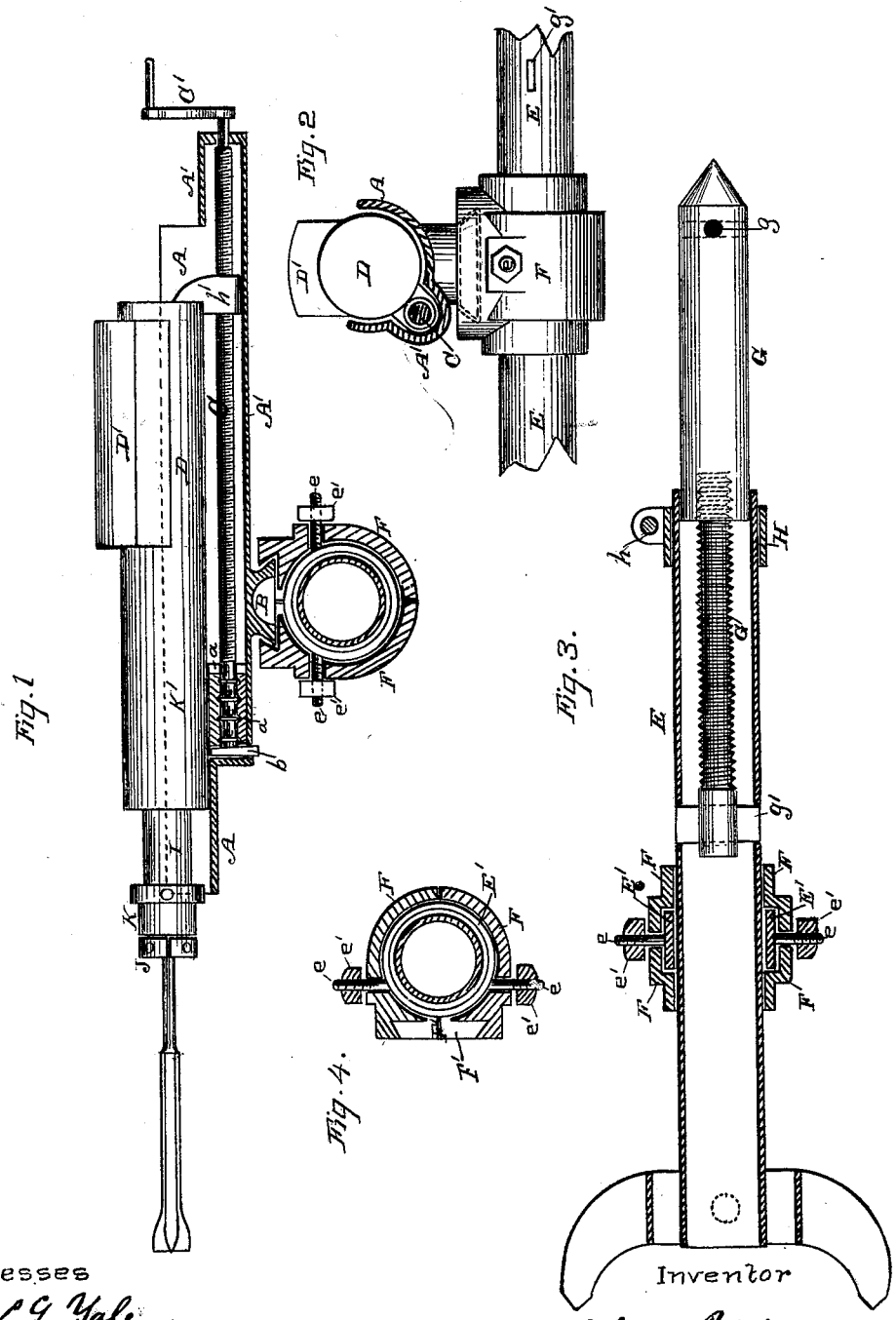

HENRY RICHMANN, OF SAN FRANCISCO, CALIFORNIA, ASSIGNOR OF FIVE-EIGHTHS OF HIS RIGHT TO URIAH K. ARNOLD, OF SAME PLACE.

SUPPORT AND CLAMP FOR ROCK-DRILLS.

SPECIFICATION forming part of Letters Patent No. 231,238, dated August 17, 1880.

Application filed April 19, 1880. (No model.)

*To all whom it may concern:*

Be it known that I, HENRY RICHMANN, of the city and county of San Francisco, and State of California, have invented an Improved Support and Clamp for Rock-Drills; and I hereby declare the following to be a full, clear, and exact description thereof.

My invention relates to certain improvements in that class of devices which are used to support the cylinders of direct-acting engines intended to actuate by air or steam a drill or tool for boring rock; and my invention consists in a novel method of connecting the case or carriage carrying the cylinder to the column, and in an improved clamp for holding it in position on said column.

It further consists in a peculiar means of arrangement of the extension column or leg, whereby the screw of said leg is protected and the extension is firmly clamped to the column at any desired point to regulate the length of column, as illustrated in the accompanying drawings, in which—

Figure 1 is a transverse section of the support applied to the drill; Fig. 2, view of a portion of the support where it is attached to the drill. Fig. 3 is a longitudinal section of the drill-support. Fig. 4 is a transverse section of same.

Let A represent the semi-cylindrical case or carriage in which the cylinder and the operating mechanism of a drill are supported, this case or carriage having formed upon its side a peculiarly-shaped hollowed bevel-edged trunnion, B, by means of which it is attached to the column or tripod, as hereinafter described.

In order to attach or connect the drill case or carriage to the column E, I place a ring, E', around the column loosely, upon each side of which are formed bolts $e$. Upon these bolts is fixed the clamp F, which is formed in two halves, as shown, each half having a hole, through which one of the bolts $e$ passes. Nuts $e'$ are then screwed on the ends of the bolts to keep the halves of the clamp in place.

The socket or journal F', into which the trunnion B of the case or carriage fits, forms part of each half of the clamp. Its flange is inwardly beveled, as shown, to correspond with the bevel-edged trunnion, so that when the said trunnion is placed between the halves of the socket and the nuts $e'$ are screwed up the clamp has a firm gripe on said trunnion.

The central inner portion of each half of the clamp is grooved or chambered for the reception of the ring E', so that, while the ring will hold the clamp in place when the nuts $e'$ are screwed up, the sides of the clamp will bind on the column, but not on the ring; so the clamp will remain at any desired position. A slight loosening of the nut will allow the trunnion to revolve in the socket, to admit of adjustment of the drill-carriage and drill, and the tightening or loosening of the clamp itself and relation to the column is regulated by the same nuts. The center of the trunnion is hollowed, as shown, to allow space sufficient for the ring, and its face fits close against the ring.

By this construction I am enabled to keep the drill very close to the column and overcome an objectionable feature which is common to most rock-drills—that of the drill standing too far from the column. In a large drill I am now enabled to bring the drill-carriage within one inch of the column. The vertical and horizontal adjustment of the drill-carriage and drill is made by loosening the nuts $e'$ and sliding the clamp with its ring up or down, and moving the drill-carriage by its trunnion on the socket. In this way the drill may be moved or maintained in any position.

The adjustment of the drill-column itself as to the decrease or increase of its length to adapt it to a shaft or tunnel and fix it in place is made in a peculiar manner. The column itself is hollow, so that the extension column or leg G may move up and down inside of the column. Inside of the column is a threaded rod, G', and, the extension column or leg being itself hollow and threaded inside, it is screwed up or down on the rod G' by inserting a lever in the hole $g$ at the lower end of said leg.

The lower end of the column E is split, as shown, and encircling this split is a spring-clamp, H, controlled by a screw, $h$. (See section, Fig. 3.) The threaded rod G' is secured centrally in the hollow column by means of a key, $g'$, passing through the sides of said column and a slot in the head of said rod.

To increase the length of the column to fix it in place between the floor and roof of the drift, a lever is inserted in the hole $g$ and the extension column or leg screwed down on its rod, thus being forced out of the column by means of screw G. When the extension-column is drawn out sufficiently to fix the column, by forcing the pointed leg into the floor and the dogs at the upper end into the roof, the screw $h$ is turned and the spring-clamp H tightened around the split end of the main column. This makes the lower end of the main column bind firmly around the extension or leg, which is thus prevented from turning and is fixedly held in place.

Ordinarily a screw and nut are used to tighten up the extension-column, and the leg or extension-column is externally threaded, to screw up into the column. When, therefore, this leg is screwed out the threads become exposed to injury. The screw and nut also are apt to become injured by being knocked about.

In my construction the extension or leg has its threads in a position where they are never exposed to get injured, and I can, moreover, have a short column and still extend it quite a distance.

When the clamp is tightened up the leg is kept from turning round, and is better than a nut, since it will never jar loose.

Having thus described my invention, what I claim as new, and desire to secure by Letters Patent, is—

1. In combination with the column E, the ring E', fitting loosely on said column, and provided with the pins or lugs $e$ and nuts $e'$, whereby the clamp F is connected to the column and its position adjusted, substantially as herein described.

2. The grooved clamp F, formed in two parts, as shown, and provided with the beveled socket F', said clamp being connected to the column by means of the ring E', pins $e$, and nuts $e'$, in combination with the cylinder-case A, with its beveled-edged trunnion B, whereby the drill-carriage is connected to the column, substantially as herein described.

3. In a rock-drill, the clamp formed in two parts and encircling a ring sliding on the column, said clamp being secured to the ring by nuts with its two parts adapted to inclose the trunnion of the drill-carriage, the same nuts regulating the adjustment of the clamp with respect to the column and the carriage with respect to the clamp, substantially as herein described.

4. In a column for supporting a drill-carriage, the internally-placed threaded rod adapted to receive an extension-leg, which screws over said rod and inside the column, whereby the screw-rod is protected from injury, substantially as herein described.

5. In combination with the hollow drill-column E, split at its lower end, as shown, and the internally-threaded extension-leg G, fitted to screw onto the centrally-placed rod G', the spring-clamp H, with its screw $h$, whereby the extension leg and column are immovably joined and the leg prevented from turning, substantially as and for the purpose herein described.

6. In combination with the hollow drill-column E, the centrally-placed threaded rod G', secured inside said column by the key $g'$, and the internally-threaded extension column or leg G, fitting on said rod inside the column, whereby the length of the column is adjusted and the threads protected from injury, substantially as and for the purpose herein described.

In witness whereof I have hereunto set my hand.

HENRY RICHMANN.

Witnesses:
S. H. NOURSE,
FRANK A. BROOKS.